United States Patent
Amacker

(10) Patent No.: US 8,725,795 B1
(45) Date of Patent: May 13, 2014

(54) CONTENT SEGMENT OPTIMIZATION TECHNIQUES

(75) Inventor: Matthew W. Amacker, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 195 days.

(21) Appl. No.: 13/163,622

(22) Filed: Jun. 17, 2011

(51) Int. Cl.
*G06F 15/16* (2006.01)

(52) U.S. Cl.
USPC ............... 709/203; 709/224; 709/231; 725/9

(58) Field of Classification Search
None
See application file for complete search history.

(56) References Cited

U.S. PATENT DOCUMENTS

| | | | |
|---|---|---|---|
| 6,557,042 B1 * | 4/2003 | He et al. | 709/231 |
| 2006/0200413 A1 * | 9/2006 | Kessel et al. | 705/50 |
| 2009/0055759 A1 * | 2/2009 | Svendsen | 715/764 |

FOREIGN PATENT DOCUMENTS

EP 2355104 A1 * 8/2011

* cited by examiner

*Primary Examiner* — Thomas Dailey
*Assistant Examiner* — Nam Tran
(74) *Attorney, Agent, or Firm* — Novak Druce Connolly Bove + Quigg LLP

(57) ABSTRACT

Techniques for content segment optimization are disclosed. In one embodiment, the method for content segment optimization comprises receiving a user selection of a content item available on a network resource, providing a segment of the content item to a user for accessing, recording user activity on the network resource subsequent to the user accessing the content item segment, determining a type of user activity with respect to the content item based on the recorded user activity, and assigning a score to the segment provided to the user. The assigned score corresponds to the determined type of user activity with respect to the content item. Scores for each segment of the content item provided to users are combined to select a representative segment for the content item. The user activity includes purchasing the item, renting the item, adding the item to wishlist, or providing a review of the item.

24 Claims, 11 Drawing Sheets

CONTENT SEGMENT OPTIMIZATION TECHNIQUES

BACKGROUND

Electronic entities having a presence in an electronic environment, such as may be provided via a Web site or other such source of content, often take advantage of the full capabilities of modern Web-based services to deliver a compelling user experience. For example, an Internet user may access Web sites offering items, products, video and audio content, or services for sale. Frequently, an electronic entity operating such a Web site offers the capability for a user to sample content that the user is interested in purchasing. Accordingly, a user may be afforded an opportunity to access a brief excerpt (segment, sample) of a content item in order to encourage the user to purchase the content item based on the user's appreciation of the accessed sample. For example, a user may be provided an opportunity to listen to a sample of audio content rendered on a network resource, such as, for example, a segment of a song or another music piece.

However, content segments offered to users for sampling are typically randomly selected and therefore may not represent the whole content fairly or accurately. As a result, users may not accurately judge content and consequently may refrain from purchasing content that they would have purchased had they been given access to a sample that represents the content accurately. Accordingly, content provider may lose revenue that would have been incurred had the content samples selected for users' access accurately reflected the content.

DETAILED DESCRIPTION

Figure 1:
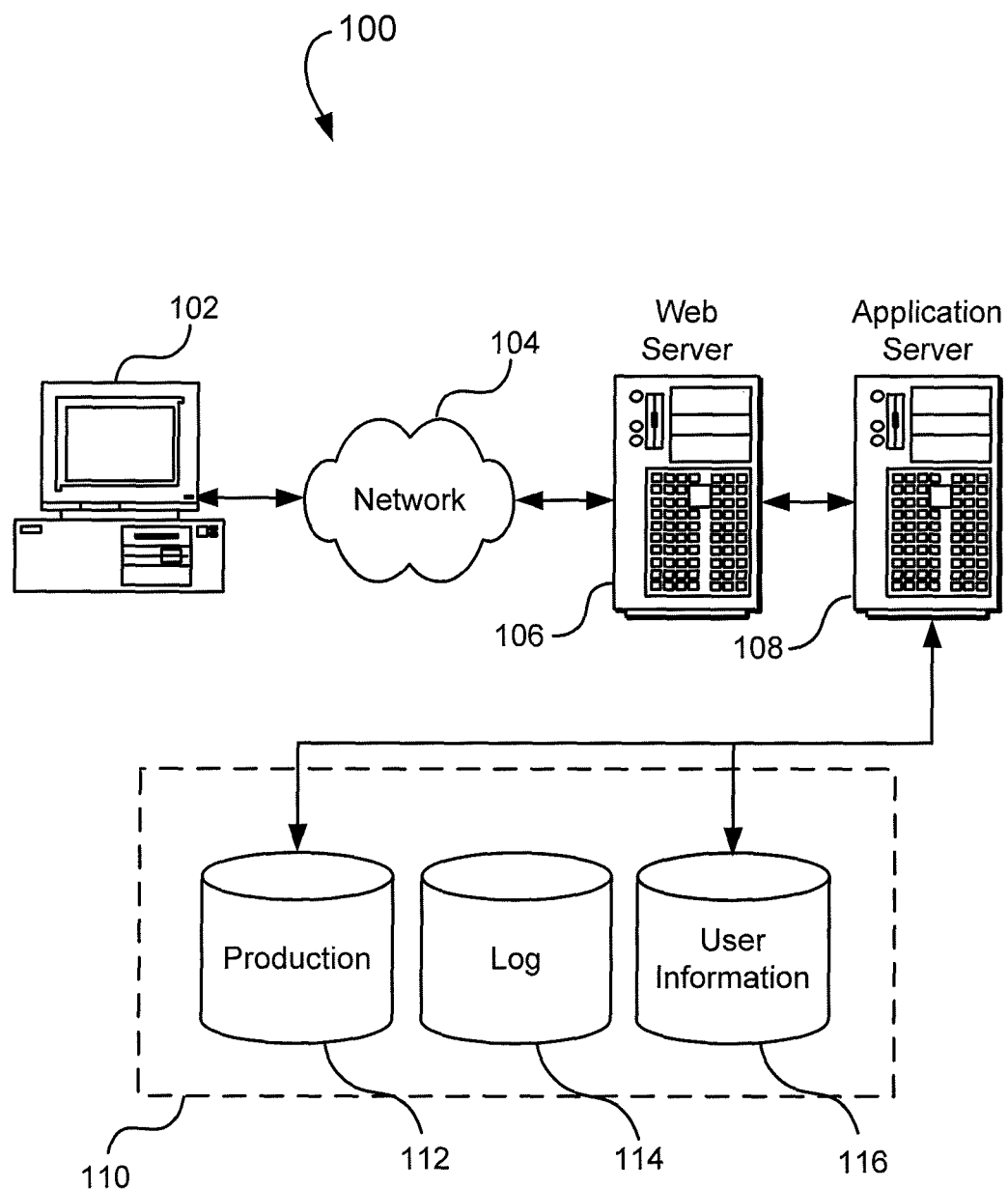
FIG. 1 illustrates an environment in which various embodiments can be implemented.

Techniques are presented for optimization of various item segments, such as segments of items of interest to be rendered to a user. In a network-based environment (e.g., based upon the Internet), a user may conduct a search for any item of interest, including textual, video or audio content on a network resource using one or more search services, such as at least one network search engine. A network resource may include a collection of content such as a Web site or electronic marketplace that can be accessed through a client browser or other such interface and displayed on a display element of a computing device. A network resource visited by a user may contain information for one or more content items (e.g., video or audio content) that the user has located, such as through browsing or search. In an embodiment, a user may be afforded an opportunity to access one or more segments of a rendered content item in order to review the segment (e.g., listen to a song fragment) and make a judgment as to whether the content item is worth further exploration and perhaps acquisition.

In accordance with an embodiment, a content item may be divided in a number of different segments which may be selected (e.g., randomly) and presented to users upon request (for example, request for the content item or request for a segment). User activities with regard to the content item that occur subsequent to accessing the rendered segment may be recorded, analyzed, and the segments associated with the content item may be ranked according to the recorded user activity. If accessing (e.g., listening or viewing) a particular content item segment resulted in a user purchasing the content item, the accessed segment may be assigned a predetermined (e.g., highest) score.

As a non-limiting example, if accessing a content item segment resulted in a user renting, reviewing, or adding the content item to his or her wishlist, the accessed segment may be assigned a predetermined score that corresponds to a level of user interest in the content item. For example, a score assigned to a segment accessing which lead to a user review of the item may be lower than a score assigned to a segment accessing which lead to a user purchasing the item.

The scores assigned by users to different segments of the content item may be recorded and a segment that has the highest score among other segments associated with the item that were rendered to the users (in an embodiment, relative to numbers of users accessed each segment) may be selected as a segment representative of the content item and offered to users for accessing going forward.

In one embodiment, techniques described herein utilize filtering content items based on the recorded user activities occurring subsequent to accessing content item segments. Filtering techniques may include using different filtering criteria, for example, user profiles identified for each user who accessed the content item segments. The user profiles may include, but may not be limited to, a user's gender, profession, interests, parental status, and the like. The content items may be filtered taking into account preferences of user belonging to a particular user profile.

In one embodiment, network resources may be identified from which user feedback regarding content items based on accessed segments may be retrieved and accumulated. For example, feeds from social networking network resources (e.g., feeds related to the user's updates of his/her page on Facebook® or Twitter®) may be utilized to obtain user reviews of content items. User reviews may be analyzed and user's intent for a review (e.g., positive, or negative) may be identified. Based on the results of the user review, the accessed segments may be assigned scores corresponding to the user intent for the review.

In one embodiment, boundaries between two adjacent segments of a content item may be manipulated in order to determine which segment represents the item best. For example, the boundary between two segments may be moved in time forward or backward, thus changing both segments. Analyzing users' feedback based on accessing changed segments and assigning respective scores may determine which segment is the best representative of the content item.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above-listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

Figure 2:
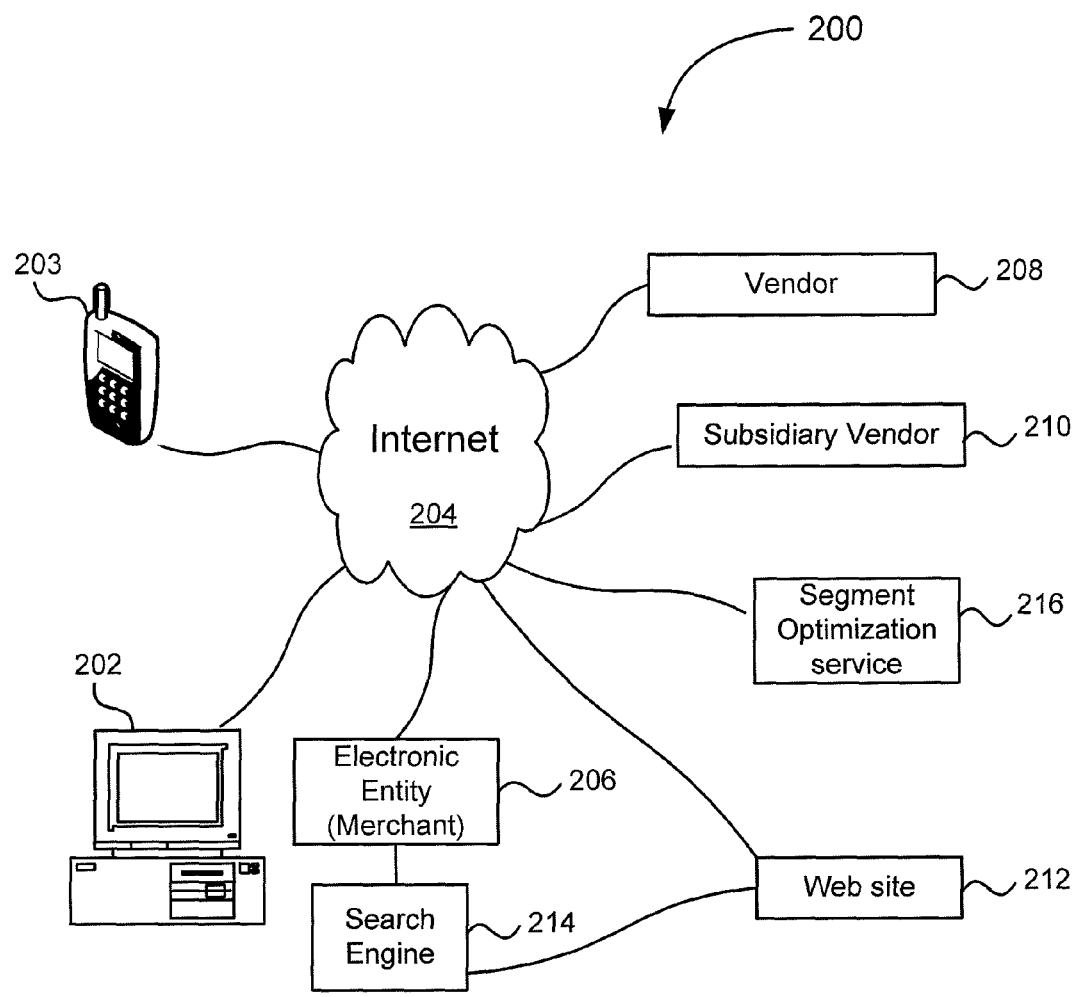
FIG. 2 illustrates an environment in which various embodiments may be practiced.

FIG. 2 shows an example environment 200 in which various embodiments may be practiced. The environment 200 may be realized utilizing one or more of the components of the environment described above in connection with FIG. 1. The environment 200, in an embodiment, includes a plurality of users operating client computing devices 202 and 203 that utilize a network such as the Internet 204 to browse content of various content providers. While the environment 200 shows the client computing devices 202 utilizing the Internet, it should be understood that other networks may be used as an alternative to or in addition to the Internet 204. Examples of other networks include mobile networks, intranets, and generally any suitable communications network. Likewise, it should be understood that client computing devices 202 and 203 may include personal computers, cell phones, handheld messaging devices, laptop computers, set-top boxes, personal data assistants, electronic book readers, and the like.

In an embodiment, users may interact through devices 202 and 203 with other entities in order to consume content, search for information or items for consumption, purchase items for consumption, and the like. As used herein, an item for consumption or content item includes any product or item which may be consumed by a consumer. Examples include tangible items, such as consumer products. Examples also include electronic items which may be downloaded and/or streamed, including audio files, video files, and other digital content. Examples of items for consumption also include services which may be performed for and/or on behalf of consumers. As shown in FIG. 2, the environment 200 includes an electronic entity, or merchant 206. The merchant 206, for example, may operate an electronic marketplace such that the users may search, via devices 202 or 203 utilizing search services (e.g., a Web search engine 214), for items for consumption offered by the merchant 206. The merchant 206 may offer items for consumption that come from various sources, including the merchant's own sources. For example, the merchant 206 may operate systems, such as those described above in connection with FIG. 1, that enable others to utilize the systems to offer items for consumption. In short, the merchant 206 may facilitate user search and consumption of items or products offered by the merchant 206 and/or vendors 208 and/or 210, as well as creating wishlists of items by the users of devices 202 or 203.

In an embodiment, the environment 200 includes one or more affiliate or third-party vendors 208. In an embodiment, an affiliate vendor is a merchant who offers for consumption items that are actually consumed by consumers from the merchant 206. Affiliate vendors 208 may cooperate with the merchant 206 in various ways. In one embodiment, the merchant 206 may operate an electronic marketplace, such as a Web site 212 and advertise and/or sell items for consumption that are offered by the affiliate vendor 208. Affiliate vendors 208 may utilize various systems provided by the merchant 206, such as electronic search services that enable users to search for items for consumption, and other systems.

The environment 200 may include one or more subsidiary vendors 210. In an embodiment, a subsidiary vendor is a merchant whose operations may be controlled, either completely or partially, by the merchant 206. For example, a subsidiary vendor 210 may be operated by the merchant 206, but may offer items for consumption under a brand different from that of the merchant 206. The subsidiary vendor 210 may offer products for consumption that are the same as or different from those offered by the merchant 206. Alternatively, the subsidiary vendor 210 may be operated by the affiliate vendor 208, but may offer items for consumption under a different brand than the affiliate vendor 208, which may be advertised and/or offered for sale by the affiliate vendor 208 on the merchant 206's Web site 212.

In an embodiment, the environment 200 includes components and instructions for generating one or more Web sites 212. One or more of the Web sites 212 may be operated by the merchant 206, although they need not be. The Web sites 212 may offer various types of content, such as news, video, audio, text content, shopping for products, and the like. The Web sites 212 may offer other services, such as content or product search services, social networking services, and the like. While the example environment 200 shows Web sites for the purpose of illustration, it should be understood that any type of content may be included in the environment 200 or variations thereof. For example, content may be provided in various ways, such as through an application interface or through other mechanisms that may not be properly classified as Web sites.

As noted, in an embodiment, the users may interact with content from the various entities, such as by searching products offered by the entities, reviewing content from the entities, consuming items from the entities, creating wishlists, and the like. In order to review content, users may access content segments generated by the system, in one embodiment, utilizing Segment Optimization service 216. For example, users of the devices 202 and 203, when accessing a particular content item (e.g., a song), may receive one or more segments (e.g., samples of a song of a predetermined length) representing the content item rendered on the Web site 212. The Segment Optimization service 216 may record subsequent user activities related to the content item of interest on the Web site 212 and other network resources.

Subsequently, the Segment Optimization service 216 may determine a level of user interest in the content item represented by the content item segment or segments rendered to users (for example, a user may purchase a song after listening to a song sample or provide a review of a song based on the sample), assign scores corresponding to the level of user interest to each segment representative of the content item (e.g., assign a highest score to the segment if a user purchased the song subsequent to listening to the segment, or assign a lower score to the segment if a user submitted a review of the song based on the segment), and select the segment with the highest accumulated score as the "best" representative of the content item. The operation of the Segment Optimization service 216 will be described in greater detail in reference to FIGS. 3-11.

In order to search for items or other content provided by the entities, the users may utilize a search service, e.g., the Web search engine 214. As one skilled in the art will appreciate, a Web search engine may be a software or a combination of software and hardware designed to search for information on the Internet. The search engine may be rendered to a client device 202 via a particular Web site or Web sites, such as the Web sites 212. The Web search engine 214 may be affiliated with the merchant 206 in a number of different ways, such as, for example, it may be designed and/or owned by the merchant 206, operated by the merchant 206, contracted by the merchant 206, be independent or autonomous from the merchant 206, and the like.

Figure 3:
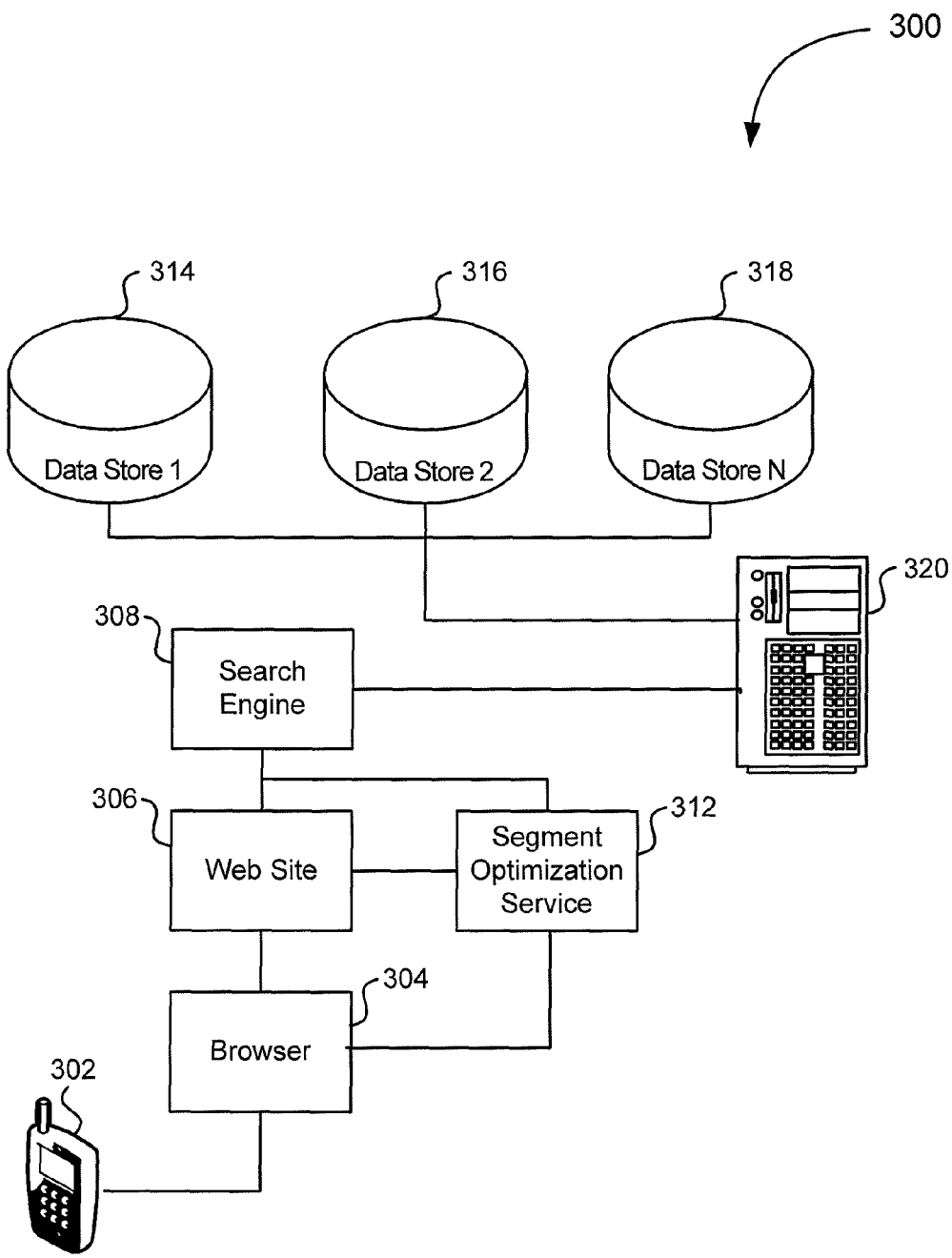
FIG. 3 illustrates a diagrammatic representation of an environment which may incorporate one or more components that are described above in connection with FIGS. 1 and 2 and that may be used in accordance with various embodiments.

FIG. 3 shows an illustrative environment 300 that an electronic entity such as the merchant 206 may utilize in order to provide a user with an ability to create wishlists for third parties and update wishlists created for third parties with product items or other content offered by the merchant 206 and/or vendors 208 and 210 using Segment Optimization service 216 in accordance with an embodiment. In an embodiment, the environment 300 of FIG. 3 is utilized by an electronic entity (such as the merchant 206 shown in FIG. 2) to optimize content item segments of a content item rendered by the merchant 206 using a Segment Optimization service 312 described herein. It is to be understood that the Segment Optimization service may comprise a number of various implementations, including, but not limited to, a software application component executed on a computing device, such as one or more Web servers. In one embodiment, the service may be offered as a part of remote computing services that together make up a cloud computing platform, offered over the Internet. The service may be configured to run in a Web server environment, such as a pure Java HTTP Web server environment.

In an embodiment, the environment 300 includes a client computing device 302 utilized by a user for interaction with electronic entities that provide content. Content may be accessed by a user operating the device 302 through a browser 304. For example, content may include products or items of various types that are to be placed on a Web site 306. The Web site 306 may utilize a search engine 308 in order to provide a user with the ability to search for products offered by the merchant 206 or other entities. The content may be stored in the remote content data stores 314, 316, and 318 and may be utilized by merchants, Web sites, or other entities in order to provide users an opportunity to search for, and view, items for consumption and/or other content by navigating to a Web site 306 operated by a merchant (e.g., merchant 206 on FIG. 2) through a Web server 320. For example, the data stores may be associated with the server 320 serving the Web site 306 operated by the merchant 206. The data stores may be accessible with the search engine 308 through the Internet or any other type of computer network known in the art. It will be appreciated that the content may be stored in one or more data stores and that three data stores 314, 316, and 318 are shown for purely illustrative purposes, such that the number of data stores is not limited to three or any other number.

In an embodiment, a Segment Optimization service 312, operating on the device 302, is configured to generate and optimize content item segments for one or more content items offered on the Web site 306. In order to access a content item segment for a particular content item, a user of the device 302 may access the Web site 306 containing content items, products, or other content as described above. The Web site 306 may be displayed on the computing device 302 via the browser 304. A user may conduct a search using search engine 308 in order to search items in one or more data stores 314-318. When a user sends a search request for an item via the search engine 308, the data corresponding to the user's request is assembled and returned to the user via the Web site 306 served by the server 320 and rendered by browser 304 on computing device 302.

The users then may access one or more segments generated for the item of interest by the Segment Optimization service 312, which may be rendered to users upon request. Subsequent user activity related to the item may be recorded and analyzed by the Segment Optimization service 312. Each accessed content item segment may be assigned a score indicating a level of user interest in the content item, the scores for each content item segment may be accumulated, and the segment with the highest accumulated score may be selected by the Segment Optimization service 312 for rendering to users who selected the content item or otherwise indicated their interest in the content item subsequent to the highest-score segment selection by the Segment Optimization service 312.

Figure 4:
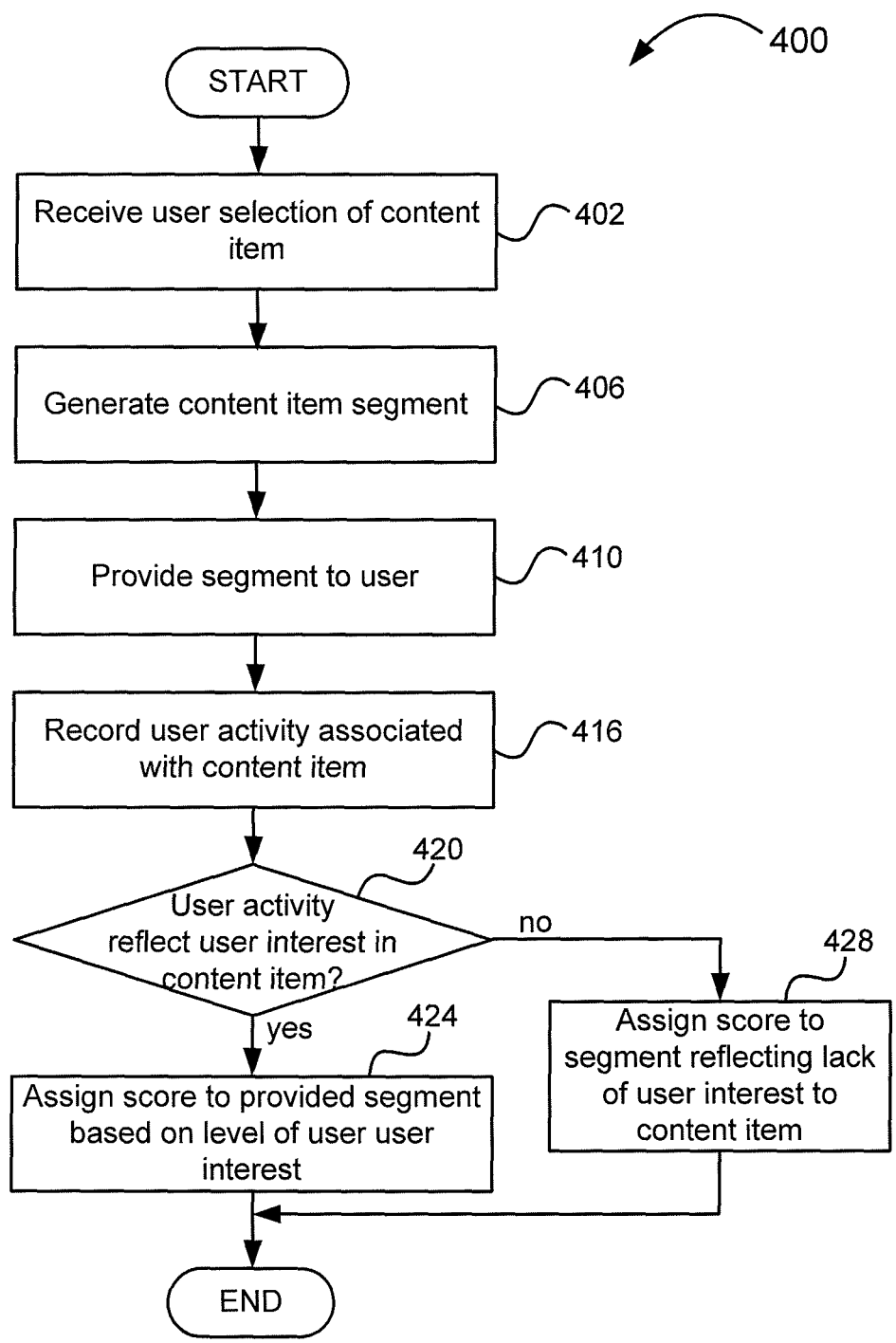
FIG. 4 illustrates a process flow diagram for content segment optimization in accordance with an embodiment.

FIG. 4 a process flow diagram for content item segment optimization in accordance with an embodiment. The process 400 starts at block 402 where a user selection of a content item is received. Examples of content items include electronic items which may be downloaded and/or streamed, including audio files, video files, text files, and other digital content offered by an electronic entity on a network resource, such as a Web site. The user may select the item subsequent to a search for content that may be conducted on a Web site offering various types of content for purchase, such as news, video, shopping for products, and the like, as described above in reference to FIG. 2.

At block 406, content segments associated with the content item are generated. Content segments may be generated in a number of different ways. For example, a content item (e.g., an audio file) may be divided in a number of segments at random. In another example, one of the segments may be selected editorially and the remaining segments may be generated based on the editorially selected segment. At block 410, one of the segments is provided to the user. The segment to be provided to the user may be selected randomly among the generated segments. The segment may be provided to the user upon request. For example, a user may request a content item on the network resource, and in response the segment may be provided along with content item information (e.g., price, availability, and the like).

At block 416, the user activity associated with the content item and occurring subsequent to accessing the content item segment is recorded. Specifically, the user browsing activity subsequent to accessing the segment may be tracked. For example, the path from accessing the content item information that includes the item segment to purchasing the content item may be recorded and the item purchase action or other action associated with the item, such as producing an item review, if occurs, may be associated with the act of accessing (e.g., viewing or listening to) the content item segment.

At determination block 420, it is determined whether the recorded user activity reflects user interest in content item. As described above, the user interest may manifest itself in a number of different actions (levels of user interest) ranging from purchasing or renting the item to reviewing the item, recommending the item to other users, adding the item to shopping cart or wishlist, and the like. Various other actions can be detected or determined as well in accordance with other embodiments. For example, if the device the user is using to access the content item is in communication with a camera operable to capture image information about the user, that image information can be analyzed to attempt to determine reactions from the user, such as the user smiling, frowning, sticking his or her tongue out, etc. Information about the reaction can similarly be used to determine a level of user interest in the content item. If the user is accessing the content item on a portable or mobile device, for example, any motion of the device during the accessing corresponding to a bopping or dancing motion might also be detected and utilized as positive user interest. If the user activity does reflect the user's interest in the content item, at block 424 a score is assigned to the provided segment based on the level of user interest determined at block 420.

Scores corresponding to each level of interest may be predetermined and stored by the Segment Optimization service in advance. For example, the score corresponding to the user action of purchasing the item may be higher than the score corresponding to the user recommending the item to other users. If the user activity is determined not to reflect the user interest in the content item, at block 428 a score to the segment is assigned that reflects the lack of user interest to content item. In one embodiment, this score may be determined to be negative or a detriment to the overall score for the segment accumulated from all users who accessed the segment. The process 400 then ends.

Figure 5:
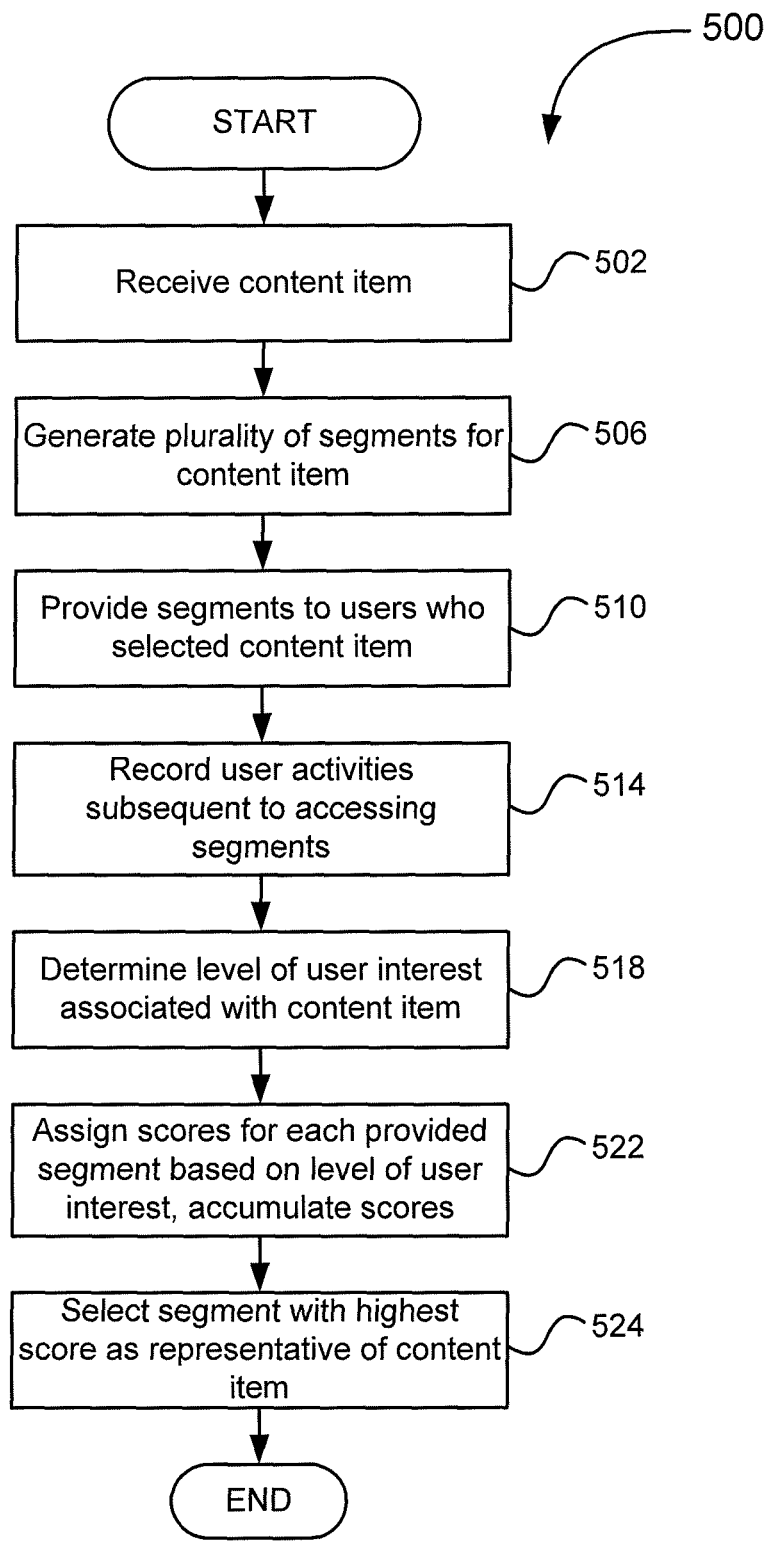
FIG. 5 illustrates a process flow diagram for content segment optimization in accordance with another embodiment.

FIG. 5 illustrates a process flow diagram for content segment optimization in accordance with an embodiment described above in reference to FIG. 4. The process 500 starts at block 502 where the content item is received or provided by an electronic merchant. At block 506, a plurality of segments for content item is generated as described above in reference to FIG. 4. At block 510, the segments are provided to users who requested (e.g., selected) the content item. At block 514, user activities in relation to the content item that occurred subsequent to accessing provided segments is recorded.

At block 518, the level of user interest associated with content item is determined based on the recorded user behavior as described above in reference to FIG. 4. At block 522, scores for each provided segment are assigned based on the level of user interest in relation to the content item that the segment represents. As more users access the item segments, more user activity information is recorded, analyzed, and more scores for each provided segments are accumulated. At block 524, the segment with the highest score accumulated for a predetermined period of time is selected as a representative of the content item. In an embodiment, a number of users accessed each segment may be taken into account. For example, the segment with the highest number of users may be given addition score boost. In another example, a ratio of the accumulated score to a number of users accessed a particular segment may be calculated and compared with the ratios calculated for other segments of the same content item. The process 500 then ends.

Figure 6:
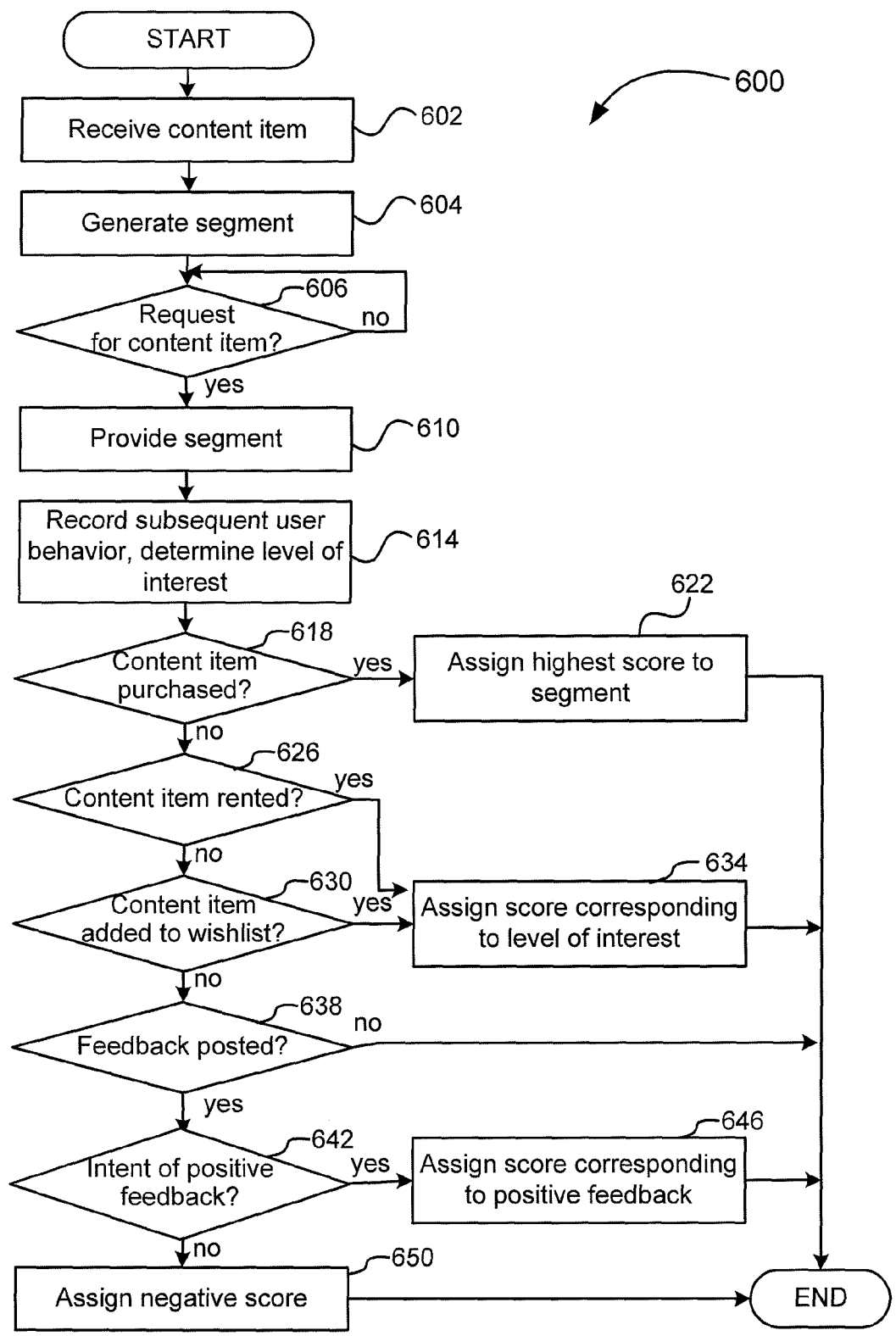
FIG. 6 illustrates a process flow diagram for content segment optimization in accordance with yet another embodiment.

FIG. 6 illustrates a process flow diagram for content segment optimization in accordance with another embodiment. More specifically, the process 600 describes assigning scores to content item segments in relation to a level of user interest to the content item that is derived from the analysis of recorded user activities subsequent to accessing the segments. The process 600 begins at block 602 where the content item is received. At block 604, at least one segment for the content item is generated. At block 606, it is determined whether the request for the content item or for a content item segment is received. If such request is received, at block 610, the segment is rendered to the user.

At block 614, user activities relative to the content item that occurred subsequent to accessing the content item segment is recorded and the level of interest of the user to the content item is determined based on the recorded user activities. Specifically, at determination block 618, it is determined whether the content item is purchased. If the content item is purchased at block 622, the highest score to the segment is assigned. If the content item is not purchased, at block 626 it is determined whether the content item is rented. If the content item is determined to be rented, at block 634, the score corresponding to that level of interest is assigned. If the content item is not rented, at determination block 630, it is determined whether the content item is added to the wishlist. If the content item is added to the wishlist, at block 634, the score corresponding to this level of interest is assigned to the segment. As described above, the score for each level of interest may be predetermined in advanced and stored by the Segment Optimization service.

If the content item was not added to the wishlist, at block 638, it is determined whether the user left any type of feedback to the content item. For example, the user may review the content item, leave his or her comments with regard to the item, recommend item to friends, and the like. If the feedback is provided, e.g., the content item is reviewed, at block 642 the review or other type of feedback is analyzed according to known techniques in order to determine the intent of the review. Specifically, it is possible to determine from a review whether the intent of the review is positive, negative, or undeterminable. Accordingly, if it is determined that the intent of feedback (review) is positive or undeterminable, at block 646 the score corresponding to the positive review is assigned to the segment. If the intent of feedback (review) is not positive or undeterminable, the intent is determined to be negative. Accordingly, at block 650, a score corresponding to a negative feedback (e.g., negative or detrimental score) is assigned to the segment. The process 600 then ends.

Generally, user feedback to content, such as, for example, content item reviews may be associated with, and created on, the network resource that renders content to a user. Alternatively, user feedback (e.g., reviews, recommendations, comments, and the like) may be retrieved from other content resources. For example, a review or comment may be auto-pulled or fed from a Web resource (e.g., a social networking site such as Facebook® or Twitter®) with which the user may be associated and posts his/her messages.

Figure 7:
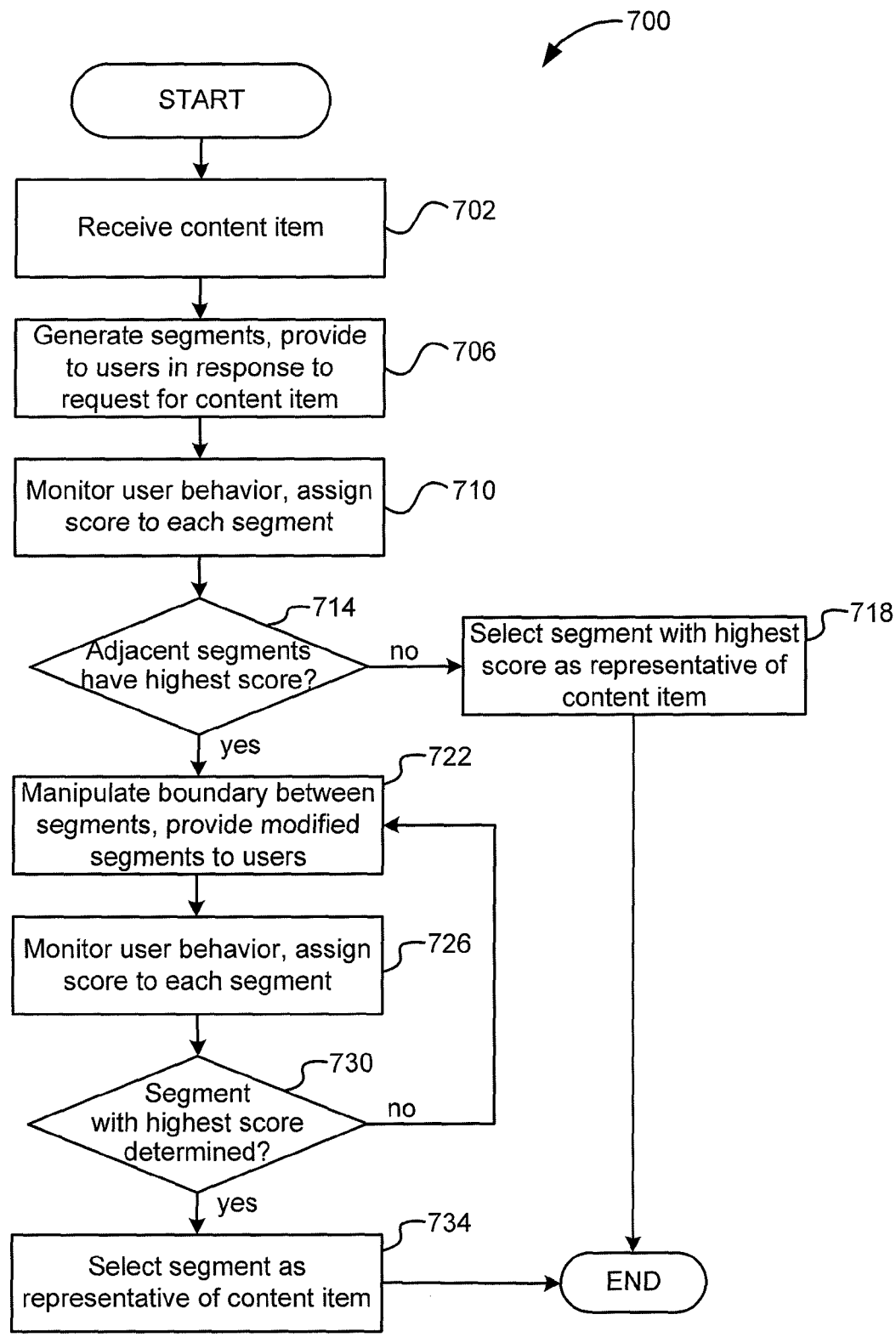
FIG. 7 illustrates a process flow diagram for content segment optimization in accordance with yet another embodiment.

FIG. 7 illustrates a process flow diagram for content segment optimization in accordance with yet another embodiment. Specifically, the process 700 describes manipulating boundaries between two adjacent segments of a content item in order to determine which segment represents the item best (e.g., the segment with the highest score between the two). For example, the boundary between two segments may be moved in time forward or backward, thereby changing each segment according to a new position of the boundary between the two segments. Analyzing users' feedback based on accessing changed segments and assigning respective scores may determine which segment is the best representative of the content item.

The process 700 begins at block 702 whether the content item is received. At block 706, segments associated with the content item are generated and provided to users in response to the request. At block 710, the user behavior is monitored and the score to each segment is assigned according to the results of the monitoring of user behavior. At block 714, it is determined whether any two adjacent segments each have the highest score among all segments associated with the content item. For example, two adjacent segments may have scores that are highest among all scores recorded for other segments of the content item and that are within a predetermined margin from each other.

If no adjacent segments have the highest scores, at block 718, the segment with the highest score among all segments as representative of the content item and the process ends. If, however, it is determined that two adjacent segments have the highest scores among all segments and that are within the predetermined margin from each other, at block 722, the boundary between the segments may be manipulated (e.g., shifted between the segments) and the segments with updated boundaries are again provided to the users requesting the content item.

At block 726, the user activities with relation to the content item that occurred subsequent to accessing each of the two modified segments is monitored and the score to each of the updated segments is assigned based on the monitored user behavior. At block 730, it is determined whether the segment with the highest score may be determined from the scores accumulated for each of the two segments. If such determination is not yet possible, the process returns to block 722, where the boundary is shifted again and the process described in blocks 726 and 730 repeats. If, however, the segment with the highest may be determined, at block 734, the segment representative of the content item is selected as a segment with the highest score. The process 700 then ends.

Figure 8:
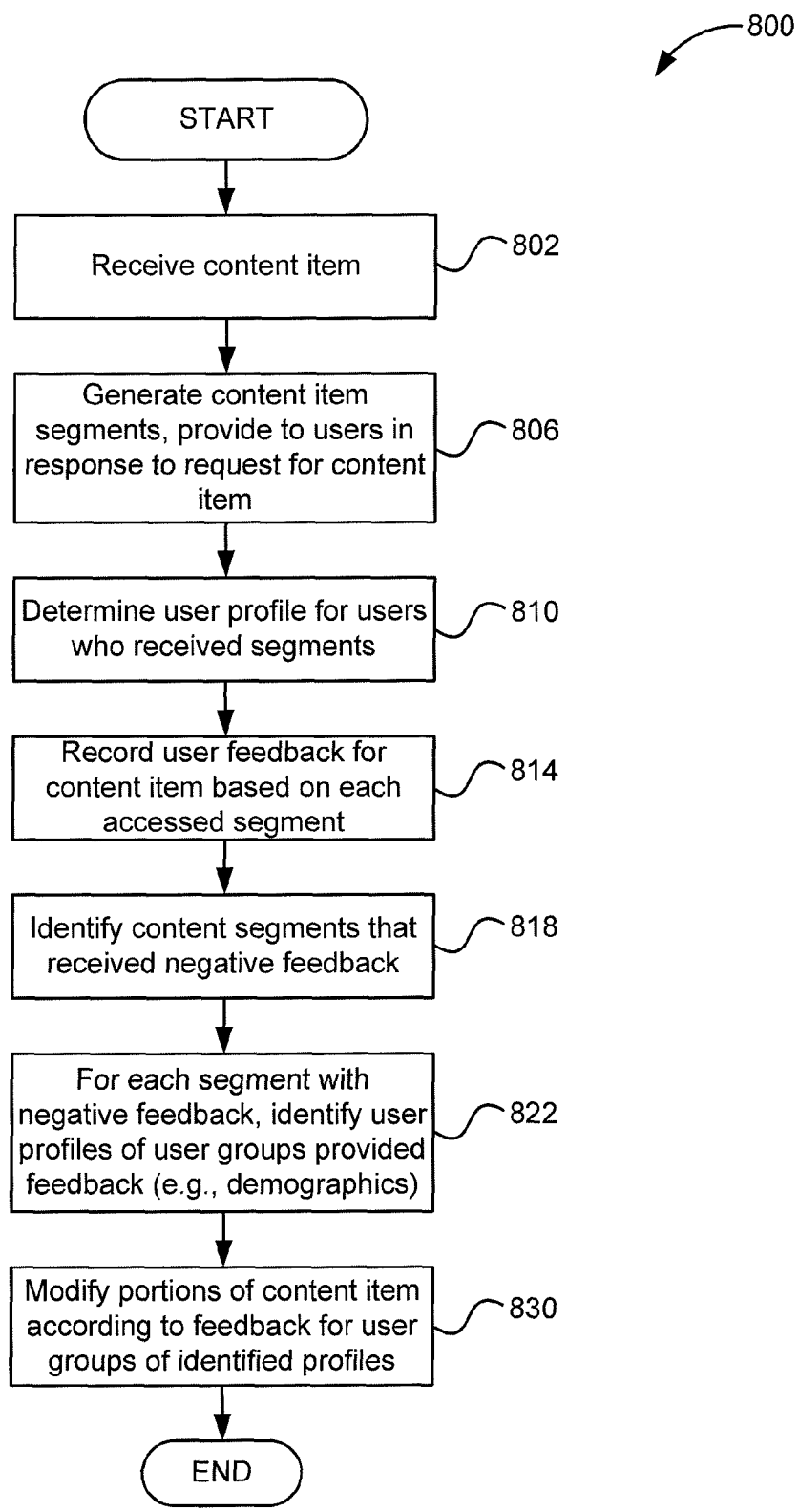
FIG. 8 illustrates a process flow diagram for content segment optimization in accordance with yet another embodiment.

FIG. 8 illustrates a process flow diagram for content segment optimization in accordance with yet another embodiment. Specifically, the process 800 describes filtering content items based on the recorded user activities occurring subsequent to accessing content item segments rendered to users. Filtering techniques may include using different filtering criteria, for example, user profiles identified for each user who accessed the content item segments. The content items may be filtered taking into account preferences of user belonging to a particular user profile. For example, segment or segments of a song that users belonging to "parents" profile determined as offensive or otherwise objectionable, may be removed when the song is rendered to children.

The process 800 begins at block 802 where the content item is received. At block 806, the content item segments are generated and provided to users in response to request for content item or for the segment. At block 810, the user profile for users who receive segments for accessing is determined. The user profile may be derived from the user's self-described profile and obtained from information associated with the user, for example audio or video files related to the user. The user profile may be pulled from a Web resource associated with the third party (e.g., Facebook®, Amazon.com®, and the like). In an embodiment, a gender, age, profession, hobby, or other preferences of the user may be determined.

The search results can be retrieved and filtered based on the determined user profile. At block 814, the user feedback for content item based on each accessed segment is recorded. At block 818, those content segments based on which the negative feedback for their item was received are identified. At block 822, for each segment with a negative feedback, user profiles of user groups provided feedback may be identified. The user profiles of user groups may include, but may not be limited to, a user's gender, profession, interests, parental status, and the like. At block 830, the portions of content item may be modified according to feedback for user groups of identified profiles. The process 800 then ends.

Figure 9:
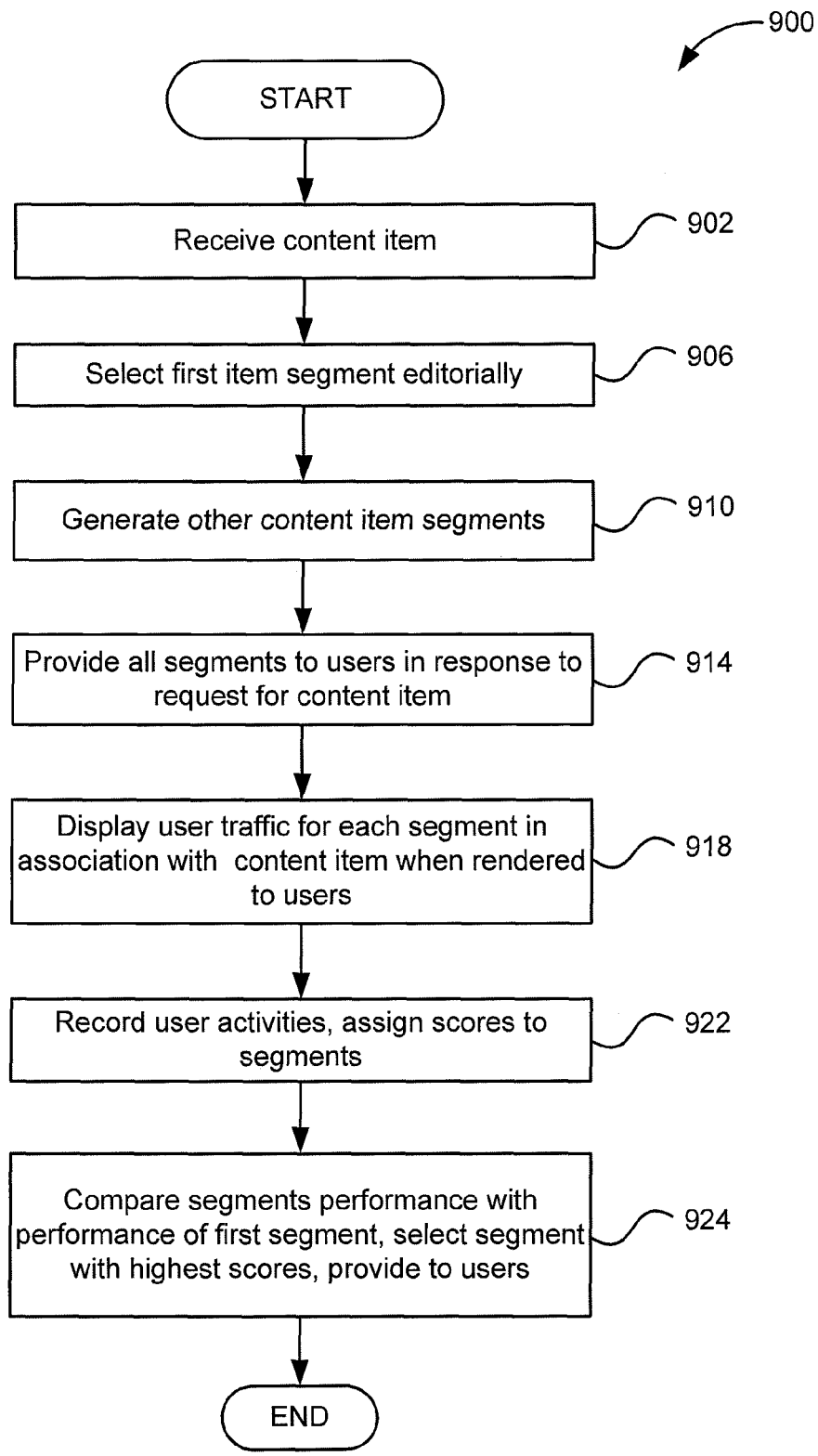
FIG. 9 illustrates a process flow diagram for content segment optimization in accordance with yet another embodiment.

FIG. 9 illustrates a process flow diagram for content segment optimization in accordance with yet another embodiment. In an embodiment, content item segments may be generated randomly. However, random segment generation may result in segments that do not represent the content item (e.g., a song, a video, a book) fairly and create a mistaken impression for the user. Accordingly, a segment may be selected editorially (e.g., by a human) based on the segment's particular attraction (tune, refrain, and the like). This selected segment may serve as a baseline for other segments that may be generated automatically. Specifically, when all segments are rendered to users, it may be determined, based on the recorded user feedback, whether automatically generated segments may compete successfully with the editorially generated segment. Accordingly, using the editorially selected segment as a baseline, it is possible to select a segment (or segments) that represent the content item fairly and favorably to the user.

The process 900 begins at block 902 where the content item is received. At block 906, a segment representative of the item is selected editorially. At block 910, other content item segments are generated. At block 914, the segments are provided to the users. At block 918, which is optional, the segments provided to the users may be accompanied by a display of an element (e.g., a histogram) indicating user traffic and/or scores accumulated for each segment. The display elements described at block 918 will be described in greater detail in reference to FIG. 11. At block 922, the user activities in relation to the content element are recorded and scores are assigned to each segment rendered to users. At block 924, segments' performance may be compared with performance of the editorially selected segment, and a segment that proved to be a "successful competitor" with the editorially selected segment (if any) may be provided to users as a "fair representative" of the content item. The process 900 then ends.

Figure 10:
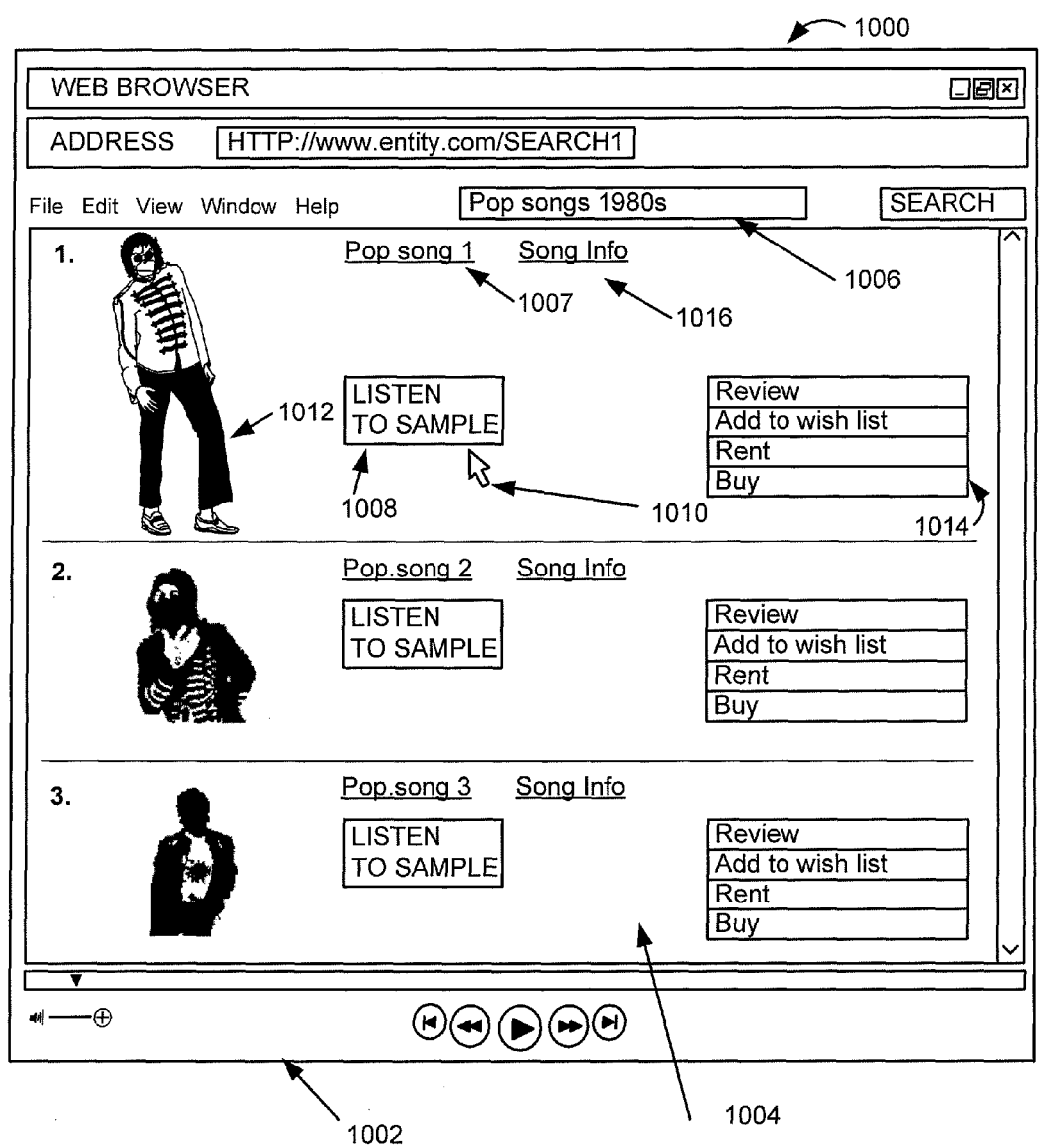
FIG. 10 illustrates an example screenshot of a user interface for a system for content segment optimization in accordance with an embodiment.
Figure 11:
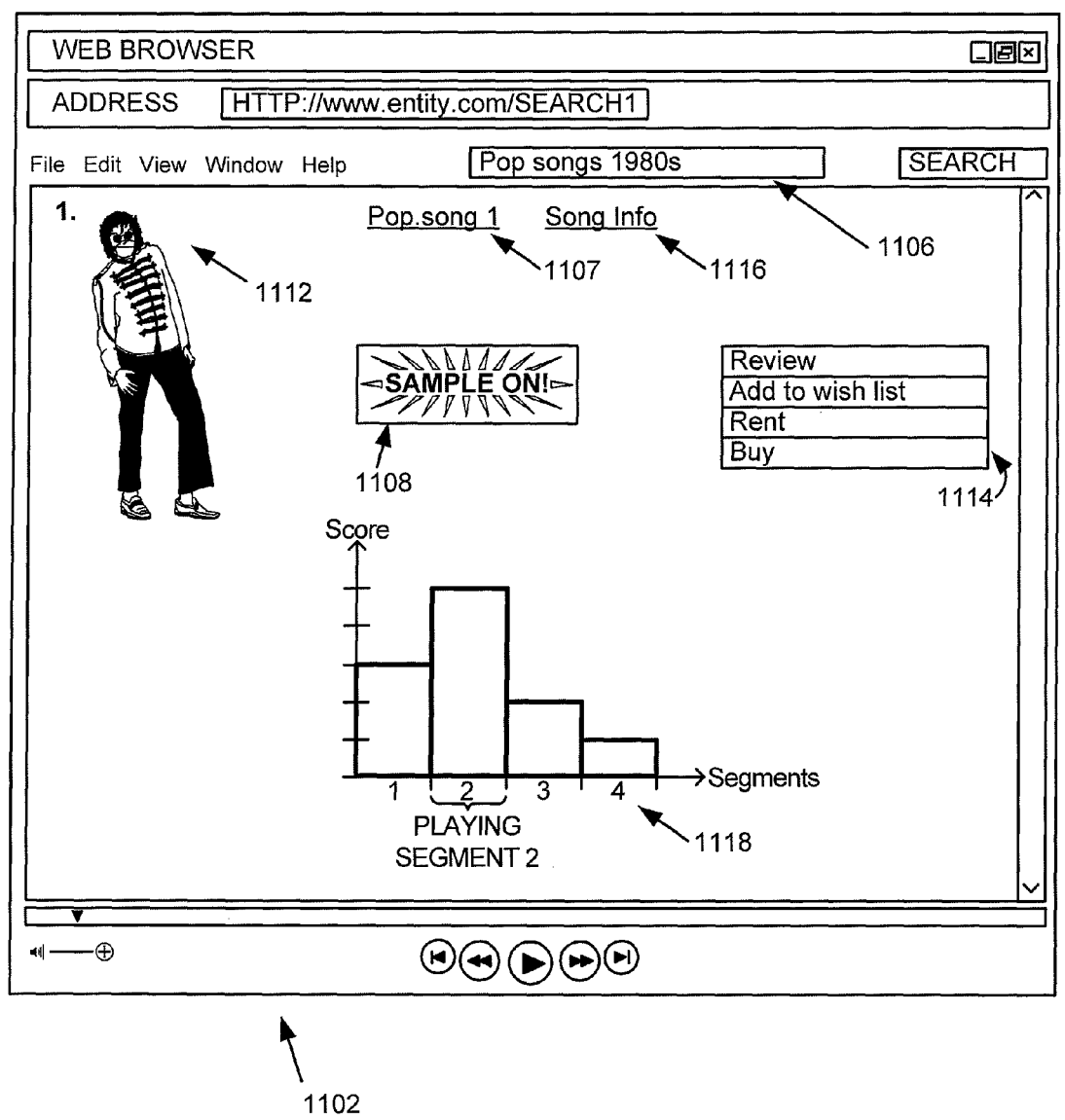
FIG. 11 illustrates another example screenshot of a user interface for a system for content segment optimization in accordance with an embodiment.

FIGS. 10-11 illustrate example screenshots of content pages showing search results including content items with associated item segments that may be rendered to a user for accessing (e.g., listening or viewing) in substantially real time according to embodiments described herein. The screenshots illustrated in FIGS. 10-11 are shown for illustrative purposes only and should not be interpreted as limiting the scope of the various embodiments.

FIG. 10 illustrates an example screenshot of a content page including search results of content items (e.g., popular songs) accordance with an embodiment. The screenshot 1000 includes a Web page 1002 showing search results 1, 2, and 3 1004 returned in response to a user query for "pop songs of the 1980s" entered in a search window 1006. The selecting element (e.g., a cursor) 1010 is shown as hovering in the area of a search result 1007 "Pop song 1." Specifically, the cursor is about to select the selectable content element (e.g., button) "Listen to sample" 1008 that, when selected, links to a "pop song 1" segment provided by the Segment Optimization service in response to the selection request as described above.

The pane displaying the search result 1 "Pop song 1" may also include an image of a performer 1012, link to additional information about the product 1016 (e.g., price, availability, length, and the like), and other selectable elements 1014 including various options for the user action, such as "Review," "Add to wish list," "Rent," and "Buy." The options 1014 correspond to various level of user interest in the content item "Pop song 1" which may be tracked by the Segment Optimization service if the user selects any one of the elements after accessing (listening to) the song segment provided in response to clicking the button 1008.

As described above, user activities regarding the content item (e.g., purchasing, renting, reviewing, adding to wishlist and the like) subsequent to accessing a segment may be tracked in a number of different ways and from different network sources, not just the Web page 1000 illustrated herein for purely illustrative purposes.

The screenshot 1000 further includes search results 2 and 3 ("Pop song 2" and "Pop song 3"), each of which include selectable elements and images similar to those described above in reference to the search result 1.

FIG. 11 illustrates an example screenshot of a content page including search results according to a user selection described in reference to FIG. 10 in accordance with an embodiment. The screenshot 1100 includes a page 1102 showing the search result 1 ("Pop song 1") 1107 returned in response to a user selection of the button "Listen to sample" described in reference to FIG. 10. The page 1102 may also include a search window 1106, an image of a performer 1112, a link to additional information about the product 1116 (e.g., price, availability, length, and the like), and other selectable elements 1114 including various options for the user action, such as "Review," "Add to wish list," "Rent," and "Buy."

The content element 1108 is shown as indicating that the sample (song segment) requested by the user is now playing. In addition, the page 1102 may include an indication of the user traffic and/or accumulated score for each segment generated for the "pop song 1." For example, the page 1102 includes the histogram 1118 illustrating four segments, scores accumulated for each segment, and an indicator of which segment is being played to the user (e.g., Segment 2). This might not be shown in at least some embodiments, and is merely provided here for clarity of explanation.

It should be understood that optimal or preferred content segments can also be used advantageously in other situations as well. For example, if a user has registered interest in certain segments of songs in that user's song library, the user can obtain a view of songs in the library that contain segments of interest for each song. Similarly, if the user registers interest in certain movie clips, the user might be able to access (or post) those segments on a page such as a personal Web site or social networking page, whereby friends can view clips of movies that are of particular interest to that user.

Further, such segments can be used advantageously even where the user has not indicated interest in some or all of the content associated with the segments. For example, a user might submit a search request to a search engine to attempt to locate videos that might be of interest to that user. The set of search results could include segments of each video that were determined by other users to be optimal (or at least interesting) segments of each video, which can help the user to more quickly locate videos of interest, etc. Further, other instances of (or references to) that content on similar or alternative pages can potentially reference or provide those segments of interest in conjunction with information about the content.

As discussed above, the various embodiments can be implemented in a wide variety of operating environments which, in some cases, can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for content item segment optimization, comprising:
   under the control of one or more computer systems configured with executable instructions,
   generating a plurality of content item segments for each content item of a plurality of content items available to a plurality of users on a network resource, each of the plurality of content item segments being a portion of the content item;
   providing one of a plurality of content item segments generated for a content item of the plurality of content items in response to each selection of the content item by one of the plurality of users;
   tracking user activity on the network resource subsequent to the user accessing the provided content item segment, the user activity being associated with the content item;

determining a level of user interest in the provided content item segment based on the recorded user activity;

assigning scores to each content item segment provided to the users, each score corresponding to the determined level of user interest in the content item;

combining assigned scores for each content item segment provided to the users;

in response to determining that two adjacent content item segments in the plurality of content item segments have a respective combined score that is first highest and second highest among the plurality of content item segments, and that the respective combined scores for each of the two adjacent content item segments are within a predetermined margin, shifting a boundary between the two adjacent content item segments resulting in the creation of two modified adjacent content item segments; and selecting one of the two modified adjacent content item segments as a representative of the content item to be provided in response to subsequent requests for the content item.

2. The computer-implemented method of claim 1, wherein the user activity includes purchasing the content item on the network resource or providing a review of the content item to the network resource.

3. The computer-implemented method of claim 2, wherein the level of user interest corresponds to the tracked user activity associated with the content item.

4. The computer-implemented method of claim 1, wherein the plurality of content item segments for each content item is generated on a random basis.

5. The computer-implemented method of claim 4, wherein the plurality of content item segments for each content item is generated based on a first content item segment that is selected editorially.

6. The computer-implemented method of claim 4, further comprising:

tracking user activity on the network resource subsequent to the user accessing the provided modified content item segments, the user activity being associated with the content item;

combining scores for each of the two modified segments, the scores being assigned based on the tracked user activity; and selecting from the two content item segments a content item segment with a highest combined score as a representative of the content item.

7. A computer-implemented method for content segment optimization, comprising:

under the control of one or more computer systems configured with executable instructions, receiving a user selection of a content item, the content item being rendered on a network resource;

providing a content item segment of the content item to a user for accessing, the content item segment being a portion of the content item;

recording user activity on the network resource subsequent to the user accessing the content item segment, the user activity being associated with the content item;

determining a type of user activity with respect to the provided content item based on the recorded user activity;

assigning a score to the content item segment provided to the user, the score corresponding to the determined type of user activity with respect to the content item;

wherein scores for each content item segment of the content item provided to users are combined;

in response to determining that two adjacent content item segments in the plurality of content item segments have a respective combined score that is first highest and second highest among the plurality of content item segments, and that the respective combined scores for each of the two adjacent content item segments are within a predetermined margin, shifting a boundary between the two adjacent content item segments resulting in the creation of two modified adjacent content item segments; and selecting one of the two modified adjacent content item segments as a representative of the content item to be provided in response to subsequent requests for the content item.

8. The computer-implemented method of claim 7, wherein the type of user activity is selected from one of: purchasing the content item, renting the content item, adding the content item to a wishlist, and providing a feedback regarding the content item.

9. The computer-implemented method of claim 8, wherein the feedback regarding the content item includes providing a review of the content item.

10. The computer-implemented method of claim 9, further comprising: identifying an intent of the provided review.

11. The computer-implemented method of claim 10, wherein when the intent is identified as positive or indeterminable, the assigned score corresponds to a positive review; and when the intent is identified as negative, the assigned score corresponds to a negative review.

12. The computer-implemented method of claim 8, wherein when the type of user activity is determined to be a purchase of the content item, the segment is assigned a highest score among scores corresponding to the types of user activity with respect to the content item.

13. The computer-implemented method of claim 7, wherein the content item is selected from audio, video, image, or text content items.

14. A computer system for content item segment optimization, the system comprising:

a processor; and a memory having computer-executable instructions that, when executed on the processor, cause the processor to:

receive a user selection of a content item, the content item being rendered on a network resource;

provide a content item segment of the content item to a user for accessing, each content item segment being a portion of the content item;

record user activity on the network resource subsequent to the user accessing the content item segment, the user activity being associated with the content item;

determine a type of user activity with respect to the provided content item based on the recorded user activity;

assign a score to the content item segment provided to the user, the score corresponding to the determined type of user activity with respect to the content item;

in response to determining that two adjacent content item segments in the plurality of content item segments have a respective combined score that is first highest and second highest among the plurality of content item segments, and that the respective combined scores for each of the two adjacent content item segments are within a predetermined margin, shifting a boundary between the two adjacent content item segments resulting in the creation of two modified adjacent content item segments; and selecting one of the two modified adjacent content item segments as a representative of the content item to be provided in response to subsequent requests for the content item.

15. The computer system of claim 14, wherein the type of user activity is selected from one of: purchasing the content item, renting the content item, adding the content item to a wishlist, and providing a feedback regarding the content item.

16. The computer system of claim 15, wherein the feedback regarding the content item includes providing a review of the content item.

17. The computer system of claim 14, wherein the computer-executable instructions further cause the processor to display to the user information regarding user traffic associated with each of the plurality of content item segments.

18. The computer system of claim 14, wherein the computer-executable instructions further cause the processor to combine scores for each content item segment of the content item provided to users to select a representative content item segment for the content item.

19. A non-transitory computer-readable storage medium having computer-executable instructions for updating content created for a third party user stored thereon that, when executed by a computer, cause the computer to:
receive a user selection of a content item, the content item being rendered on a network resource;
provide a content item segment of the content item to a user for accessing, each content item segment being a portion of the content item;
record user activity on the network resource subsequent to the user accessing the content item segment, the user activity being associated with the content item;
determine a type of user activity with respect to the provided content item based on the recorded user activity;
assign a score to the content item segment provided to the user, the score corresponding to the determined type of user activity with respect to the content item;
in response to determining that two adjacent content item segments in the plurality of content item segments have a respective combined score that is first highest and second highest among the plurality of content item segments, and that the respective combined scores for each of the two adjacent content item segments are within a predetermined margin, shifting a boundary between the two adjacent content item segments resulting in the creation of two modified adjacent content item segments; and
selecting one of the two modified adjacent content item segments as a representative of the content item to be provided in response to subsequent requests for the content item.

20. The non-transitory computer-readable storage medium of claim 19, wherein the type of user activity is selected from one of: purchasing the content item, renting the content item, adding the content item to a wishlist, and providing a feedback regarding the content item.

21. The non-transitory computer-readable storage medium of claim 20, wherein the feedback regarding the content item includes providing a review of the content item.

22. The non-transitory computer-readable storage medium of claim 21, wherein the computer-executable instructions further cause the computer to identify an intent of the provided review.

23. The non-transitory computer-readable storage medium of claim 22, wherein the computer-executable instructions further cause the computer to:
assign a score that corresponds to a positive review when the intent is identified as positive or indeterminable; and
assign a score that corresponds to a negative review when the intent is identified as negative.

24. The non-transitory computer-readable storage medium of claim 19, wherein the computer-executable instructions further cause the computer to combine scores for each content item segment of the content item provided to users to select a representative content item segment for the content item.

* * * * *